United States Patent
Da et al.

(10) Patent No.: US 9,544,858 B2
(45) Date of Patent: Jan. 10, 2017

(54) CHANNEL POWER ADJUSTMENT BASED ON POSITIONAL INFORMATION OF AREA RESTRICTED SELF-ORGANIZING SUBNETS

(71) Applicants: Bin Da, Beijing (CN); Wei Wang, Beijing (CN); Yindong Zhang, Beijing (CN); Linju Yang, Beijing (CN)

(72) Inventors: Bin Da, Beijing (CN); Wei Wang, Beijing (CN); Yindong Zhang, Beijing (CN); Linju Yang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 255 days.

(21) Appl. No.: 14/538,943

(22) Filed: Nov. 12, 2014

(65) Prior Publication Data
US 2015/0139124 A1 May 21, 2015

(30) Foreign Application Priority Data

Nov. 15, 2013 (CN) ............ 2013 1 0574407

(51) Int. Cl.
*H04W 52/28* (2009.01)
*H04W 52/24* (2009.01)
(Continued)

(52) U.S. Cl.
CPC ......... *H04W 52/283* (2013.01); *H04W 52/244* (2013.01); *H04W 52/281* (2013.01); *H04W 72/0473* (2013.01); *H04W 84/22* (2013.01)

(58) Field of Classification Search
CPC ............. H04W 52/244; H04W 52/281; H04W 52/283; H04W 72/0473; H04W 84/18; H04W 84/22
See application file for complete search history.

(56) References Cited

U.S. PATENT DOCUMENTS 6,791,472 B1 * 9/2004 Hoffberg ............ H04B 7/18576
340/539.17
8,072,917 B2 12/2011 Wu et al.
(Continued)

FOREIGN PATENT DOCUMENTS

CN 104010304 8/2014
CN 104349482 2/2015
(Continued)

OTHER PUBLICATIONS

"Noise temperature" [online], Wikipedia, the free encyclopedia, [Searched Nov. 12, 2014], the Internet URL: http://en.wikipedia.org/wiki/Noise_temperature.
(Continued)

*Primary Examiner* — Parth Patel
*Assistant Examiner* — Kai Chang
(74) *Attorney, Agent, or Firm* — IPUSA, PLLC

(57) ABSTRACT

Disclosed is a channel power adjustment method and system based on positional information of plural self-organizing subnets in a restricted area. The method includes a first setting step of setting, based on the positional information of the plural self-organizing subnets, a positional priority for each of the plural self-organizing subnets; and a first adjustment step of adjusting, at least partially based on the positional priorities of the plural self-organizing subnets, a power of a first device in a first self-organizing subnet working in a first channel, satisfying a predetermined rule to a first power of the first channel.

10 Claims, 9 Drawing Sheets

(51) Int. Cl.
*H04W 72/04* (2009.01)
*H04W 84/22* (2009.01)

(56) References Cited

U.S. PATENT DOCUMENTS

| | | | |
|---|---|---|---|
| 9,326,315 B2* | 4/2016 | Yu | H04W 84/20 |
| 2005/0152305 A1* | 7/2005 | Ji | H04L 45/54 |
| | | | 370/328 |
| 2006/0019679 A1* | 1/2006 | Rappaport | H04W 64/00 |
| | | | 455/456.5 |
| 2006/0106963 A1* | 5/2006 | Sasaki | A63F 13/12 |
| | | | 710/110 |
| 2006/0217062 A1 | 9/2006 | Saffre et al. | |
| 2007/0127417 A1* | 6/2007 | Kalika | H04L 12/2456 |
| | | | 370/338 |
| 2007/0133483 A1* | 6/2007 | Lee | H04W 52/32 |
| | | | 370/338 |
| 2007/0195721 A1* | 8/2007 | Backes | H04L 47/125 |
| | | | 370/310 |
| 2008/0235398 A1* | 9/2008 | Helbing | G05B 13/024 |
| | | | 709/243 |
| 2009/0201143 A1* | 8/2009 | McKenna | G08B 3/10 |
| | | | 340/506 |
| 2009/0316649 A1* | 12/2009 | Chen | H04W 24/02 |
| | | | 370/331 |
| 2010/0330919 A1* | 12/2010 | Gurney | H04W 52/367 |
| | | | 455/67.11 |
| 2011/0111749 A1* | 5/2011 | Kim | H04W 24/10 |
| | | | 455/423 |
| 2012/0100884 A1* | 4/2012 | Radulescu | H04W 36/0083 |
| | | | 455/524 |
| 2013/0137416 A1* | 5/2013 | Obuchi | H04W 36/32 |
| | | | 455/418 |
| 2013/0336484 A1 | 12/2013 | Sun et al. | |
| 2013/0336485 A1 | 12/2013 | Da et al. | |
| 2014/0126416 A1 | 5/2014 | Yu et al. | |
| 2014/0219262 A1 | 8/2014 | Sun et al. | |
| 2014/0241207 A1 | 8/2014 | Zhang et al. | |
| 2015/0029959 A1 | 1/2015 | Da et al. | |
| 2015/0094114 A1* | 4/2015 | Rao | H04W 52/245 |
| | | | 455/522 |
| 2016/0119862 A1* | 4/2016 | Rinne | H04W 36/14 |
| | | | 455/434 |

FOREIGN PATENT DOCUMENTS

| | | |
|---|---|---|
| JP | 2013-258697 | 12/2013 |
| JP | 2014-039261 | 2/2014 |
| JP | 2014-155224 | 8/2014 |
| JP | 2014-165919 | 9/2014 |
| WO | 02/03567 | 1/2002 |

OTHER PUBLICATIONS

Paul J. Kolodzy, "Interference Temperature: A Metric for Dynamic Spectrum Utilization", International Journal of Network Management, 2006 (02), doi:10.1002/nem.608.

* cited by examiner

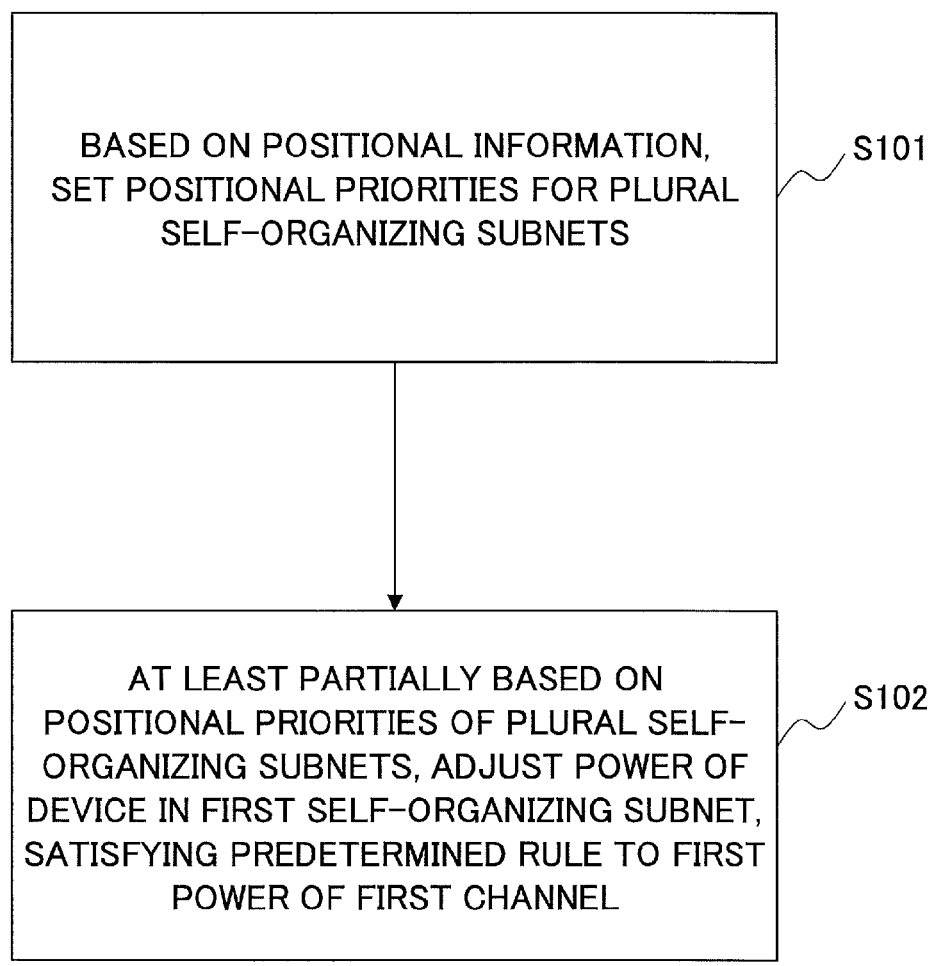

200

MASTER NODE ← INITIALIZATION

S201: SCAN AND MONITOR ALL CHANNELS

S202: SELECT ONE CHANNEL TO SERVE AS WORKING CHANNEL

S203: GENERATE AND MANAGE SELF-ORGANIZING SUBNET

S204: ESTABLISH COMMUNICATIONS WITH OTHER MASTER NODES IN OTHER SELF-ORGANIZING SUBNETS

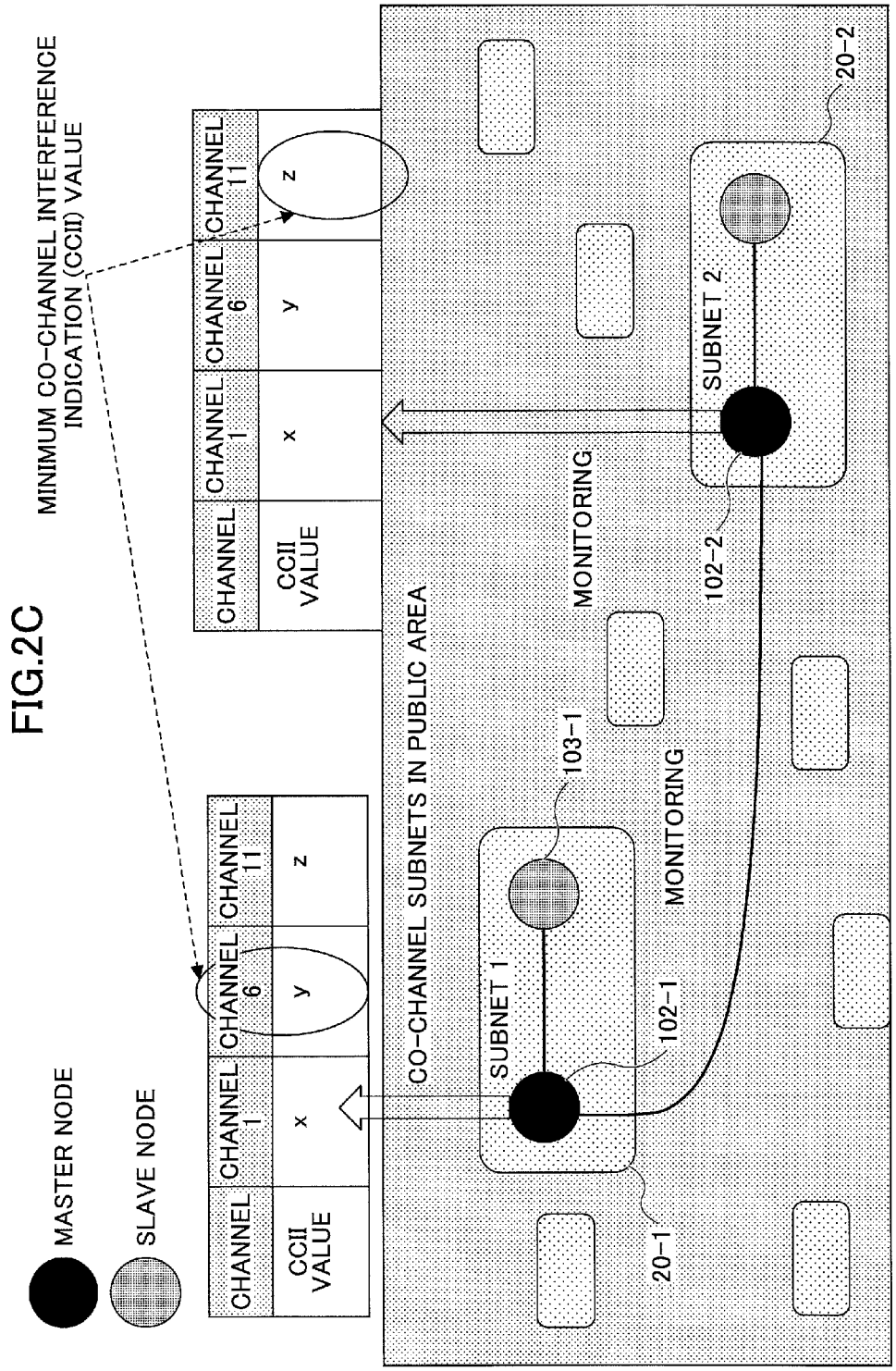

CHANNEL POWER ADJUSTMENT BASED ON POSITIONAL INFORMATION OF AREA RESTRICTED SELF-ORGANIZING SUBNETS

BACKGROUND OF THE INVENTION

1. Field of the Invention

The present invention relates to the field of communications, and particularly relates to a method and system for adjusting channel power on the basis of the positional information of at least one area restricted self-organizing subnet (or subnetwork).

2. Description of the Related Art

In a case where dense wireless channels are utilized, in the environment of Wi-Fi 802.11b/g or Wi-Fi Direct of 2.4 GHz Wireless Technology, in general, well-used channels, whose frequency bands do not overlap, are the first channel (2412 MHz), the sixth channel (2437 MHz), and the eleventh channel (2462 MHz). However, in 5 GHz Wireless Technology being developed, there are four available channels in a range of 5.725-5.825 GHz. With the increase of the number of self-organizing subnets sharing a same channel, co-channel interference generated on the basis of these self-organizing subnets increases at the same time. As a result, when it is necessary to transmit important data in a self-organizing subnet, the quality of communications of this self-organizing subnet may not be guaranteed.

In U.S. Patent Application Publication No. 2007/0133483 A1, a method of controlling transmission power on a node over a wireless ad-hoc network, which includes a plurality of sender, intermediate, and receiver nodes, is disclosed. Initially, levels of the transmission power of the node are configured. The node then exchanges information with its neighboring nodes by sending out a global signal. After exchanging the information, the node identifies a node coverage for the level of the transmission power. The node then determines an effective transmission power (ETP). Finally, the EPT is used to form a virtual cluster. However, in this method, the positional information of the node and its neighboring nodes is not utilized, and only the power adjustment of a single node is carried out.

In U.S. Patent Application Publication No. 2006/0217062 A1, a wireless channel resource adjustment method is disclosed. A terminal node receives a transmission request together with a related quality-of-service (QoS) requirement sent from another node, and then it decides a transmission power on the basis of the information carried by the transmission request and the related QoS requirement. However, in this method, the positional information and priorities of the terminal node and the other node are not utilized, and only the transmission power of a single terminal device (i.e., the terminal node) is decided on the basis of the transmission request and related QoS requirement sent from the other node.

In International Publication No. WO 02/03567 A2, a power control technique in wireless network for reducing mobile nodes' power consumption and achieving a lower signal-to-interference ratio is disclosed. The proposed power control scheme for distributed networks discloses a method for adapting and storing the power level for transmission between nodes. For each node that communicates with other nodes in the network, the power level is calculated and stored in the nodes' memories (power caches). Each node continuously builds up its power cache. The calculation of the required transmission power level is done either at the receiving node or at the transmitting node. The resulting calculated power level is stored at the transmitting node for reference and for use in future transmissions. However, in this technique, the positional information and priority of each node are not utilized, and only the transmission power having a certain level of QoS, of a single node is determined on the basis of the relationship between the premeasured transmission power and QoS.

Therefore, it is necessary to provide a technique by which it is possible not only to adjust the channel power of each self-organizing subnet but also to guarantee good communications quality.

SUMMARY OF THE INVENTION

According to a first aspect of the present invention, a channel power adjustment method based on positional information of plural self-organizing subnets in a restricted area is provided. The method includes:

a first setting step of setting, based on the positional information of the plural self-organizing subnets, a positional priority for each of the plural self-organizing subnets; and a first adjustment step of adjusting, at least partially based on the positional priorities of the plural self-organizing subnets, a power of a first device in a first self-organizing subnet working in a first channel, satisfying a predetermined rule to a first power of the first channel.

Furthermore, according to a second aspect of the present invention, a channel power adjustment system based on positional information of plural self-organizing subnets in a restricted area is provided. The system includes:

a first setting device configured to set, based on the positional information of the plural self-organizing subnets, a positional priority for each of the plural self-organizing subnets; and a first adjustment device configured to adjust, at least partially based on the positional priorities of the plural self-organizing subnets, a power of a first device in a first self-organizing subnet working in a first channel, satisfying a predetermined rule to a first power of the first channel.

As a result, it is possible to provide a channel power adjustment technique on the basis of the positional information of plural area restricted self-organizing subnets.

BRIEF DESCRIPTION OF THE DRAWINGS

FIG. 1 is a flowchart of a channel power adjustment method on the basis of the positional information of plural (a plurality of) area restricted self-organizing subnets, according to an embodiment of the present invention;

FIG. 2C illustrates an example of initializing plural self-organizing subnets;

DETAILED DESCRIPTION OF THE PREFERRED EMBODIMENTS

Figures 2A, 2B:
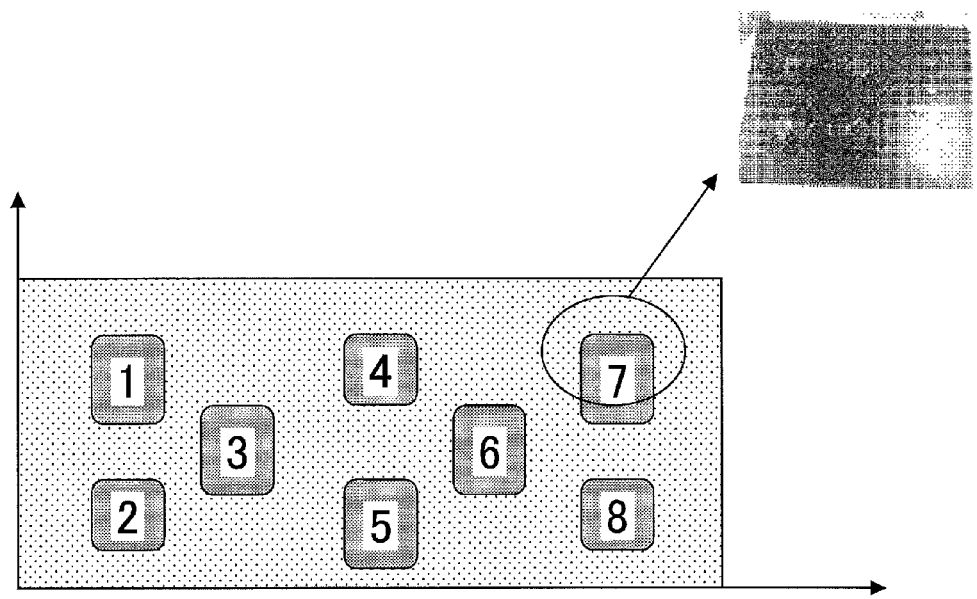
FIG. 2A illustrates an example of STEP 101 shown in FIG. 1.
FIG. 2B illustrates an initialization method of a self-organizing subnet.

In order to let those people skilled in the art better understand the present invention, hereinafter the present invention will be concretely described on the basis of the drawings and various embodiments.

Here it should be noted that the so-called "self-organizing subnet (or subnet)", "restricted area", or "area restricted network" in this specification refers to a kind of restricted area (or network) whose range (or boundary) may be limited (determined or defined) and adjusted artificially in a physical way. In this kind of restricted area, authorized wired or wireless devices may communicate with each other using an existing communications method, and an authorized device may not communicate with an unauthorized device located outside. This kind of restricted area may be limited by plural single transmitters. An example is an area limited by the intersection of infrared rays transmitted by plural infrared ray transmitters, an area limited by the intersection of light beams transmitted by plural light transmitters (for example, light emitting diodes (LEDs)), an area limited by the intersection of microwaves transmitted by plural microwave transmitters, an area limited by utilizing a near field communication (NFC) technique, or an area limited by using other signals. As a result, the restricted area in this specification is a physical layer based concept, and this kind of restricted area has a clear physical boundary.

Moreover, the so-called "area key" in this specification is used to uniquely limit (indicate) a restricted area. The area key may be transmitted by an area key transmitter. The area key transmitter may be, for example, an IR transmitter, a LED transmitter, or a microwave transmitter. The area key may be carried by, for example, an infrared ray, a light beam, or a microwave. The area key may include but is not limited to an area identifier (ID), a random secret key, a time stamp, and/or other information. The area ID included in the area key may be used to uniquely define (indicate) a restricted area, and in general, the area key may be predetermined and fixed. For example, Fibonacci Sequence may be adopted to generate this kind of area ID. However, the generation of an area ID is not limited to the use of Fibonacci Sequence. The random secret key may be periodically or nonperiodically generated by the area key transmitter, and at the same time, a time stamp for recording the time point, when the random secret key is generated, may also be generated and included in the area key.

In addition, the so-called "node" in this specification refers to a device including a mobile device such as a cellular phone, a notebook computer, a personal digital assistant (PDA), or a tablet computer. The so-called "master node" in this specification refers to a device which may conduct one of the following actions, namely, monitoring the entry of another device to the restricted area where the device is located; performing authorization on another device which has entered the restricted area; monitoring the departure of another device from the restricted area; and so on. The so-called "slave node" in this specification refers to another device in the same restricted area, not being the master node.

Here it should be noted that for more information about the self-organizing subnet, the restricted area, the area restricted network, the generation of a master node, the authorization on a slave node, the entry of a master or slave node, the departure of a master or slave node, etc., it is possible to refer to Chinese Patent Application No. 201310056656.0, the entire contents of which are hereby incorporated by reference.

FIG. 1 is a flowchart of a channel power adjustment method 100 on the basis of the positional information of plural area restricted self-organizing subnets, according to an embodiment of the present invention.

As shown in FIG. 1, the method 100 includes STEPS S101 and S102. STEP S101 is a first setting step of setting, on the basis of the positional information of the plural self-organizing subnets, a positional priority for each of the plural self-organizing subnets. STEP S102 is a first power adjustment step (sometimes called a "first adjustment step") of adjusting, at least partially based on the positional priorities of the plural self-organizing subnets, the power of a first device in a first self-organizing subnet working in a first channel, satisfying a predetermined rule to a first power of the first channel.

Here it should be noted that the positional information of the plural self-organizing subnets may be a kind of two-dimensional information, for example, two-dimensional positions of the respective self-organizing subnets in a same floor of a building, or may be a kind of three-dimensional information, for example, three-dimensional positions of the respective self-organizing subnets in different floors of the building. Furthermore, STEP S101 may be conducted by, for example, a master node of each of the plural self-organizing subnets, a user, or a dedicated controller; however, the present invention is not limited to this. Moreover, the first power of the first channel may be a higher power higher than a predetermined power, or may be the maximum power of the first channel.

As a result, in this embodiment, it is possible to set, on the basis of the positional information of the plural self-organizing subnets, the positional priority for each of the plural self-organizing subnets. In an example, a self-organizing subnet in a main conference room (e.g., a VIP (Very Important Person) room) of a company may be set having a highest positional priority; a self-organizing subnet in a refreshing room of the company may be set having a lowest positional priority; and so on. Consequently, when conducting STEP S102, in a case of this example, it is possible to adjust the power of each device in the self-organizing subnet in the main conference room to the maximum power of the channel (i.e., the first channel) in which this device works. Furthermore, the positional priorities of the respective self-organizing subnets may be periodically or nonperiodically adjusted. In this way, it is possible to dynamically set the positional priority of a self-organizing subnet to be highest. For example, if there is an important guest in the refreshing room, then it is possible to raise the positional priority of the self-organizing subnet in the refreshing room to highest from lowest, so as to ensure that the important guest may carry out fast and reliable communications.

Here it should be noted that the maximum power or the higher power of the first channel which is higher than the predetermined power may be predetermined on the basis of the bandwidth of the first channel as well as the number of self-organizing subnets sharing the first channel.

In this way, it is possible to adjust the power of each device in the first self-organizing subnet working in the first channel to the higher power or the maximum power of the first channel, so that this device in the first self-organizing subnet may communicate with another device in the first self-organizing subnet using the higher power or the maximum power of the first channel.

In an example, the first self-organizing subnet working in the first channel, satisfying the predetermined rule may be a self-organizing subnet whose positional priority is higher than a predetermined positional priority, or a self-organizing subnet whose positional priority is highest. In other words, the power of each device in a self-organizing subnet, whose positional priority is higher or highest and which is working in the first channel, may be adjusted to the higher power or the maximum power of the first channel.

In an example, the method 100 may further include a second setting step (not shown in the drawings) of setting, on the basis of the types of data to be transmitted by the plural self-organizing subnets, a data type priority for each of the types of data. Accordingly, STEP S102 may further include a step of, on the basis of the positional priorities and the data type priorities of the plural self-organizing subnets, adjusting the power of the first device in the first self-organizing subnet working in the first channel, satisfying the predetermined rule to the first power of the first channel. In this example, the data to be transmitted may be divided into plural data types on the basis of the real-time requirements or the QoS requirements of the data. For example, a data type determined based on a kind of division method may include, for instance, real time data (e.g., video data or other data whose real-time requirement is higher), non-real-time data (e.g., text data or other data whose real-time requirement is lower), and best effort data (e.g., an electronic mail or other data as real-time as possible). By adding the data type priorities to serve as one of the conditions to be considered when adjusting the power of the first channel, it is possible to, for example, in a case where there isn't data transmission or there is only non-real-time transmission in the above-mentioned VIP room, temporarily adjust (reduce) the power (i.e., the higher power or the maximum power) of the first channel, so as to let the power of another device in another self-organizing subnet located in a non-VIP room be the power of the first channel so that the other device may conduct real-time data transmission by using the power of the first channel. Of course, it is also possible to adopt another division method to divide the data to be transmitted into different data types. For example, the UGS (Unsolicited Grant Service) related data, rtPS (Real-time Polling Service) related data, nrtPS (Non-real-time Polling Service) related data, BE (Best Effort) related data, and extended rtPS related data described in the Wi-Fi standards may be utilized to divide the data to be transmitted into different data types. Furthermore, each data type may also be divided into plural sub data types. For example, the real-time data may be further divided into plural sub data types according to different levels of real-time requirements. Table 1 illustrates some data types, for instance.

TABLE 1

| Data Type | For Example | Data Type Priority |
| --- | --- | --- |
| Real-Time Data I | Video | 1 |
| Real-Time Data II | Audio | 2 |
| Real-Time Data III | File | 3 |
| Non-Real-Time Data I | Text | 4 |
| Non-Real-Time Data II | Short Message | 5 |
| Best Effort Data | Electronic Mail | 6 |
| ... | ... | ... |

Here it should be noted that the data type division method is not limited to the above. As long as the divided data types have different QoS requirements, it is okay.

In an example, the first self-organizing subnet working in the first channel, satisfying the predetermined rule includes one of the following, namely, at least one self-organizing subnet that the weighted result of its positional priority and data type priority is higher than a predetermined level; and at least one self-organizing subnet that the weighted result of its positional priority and data type priority is highest. Here it should be noted that since both the two conditions, i.e., the positional priorities and the data type priorities need to be considered when performing the channel power adjustment, it is possible to obtain the weighted result of the two so as to conduct the channel power adjustment on the basis of the weighted result. For example, regarding a self-organizing subnet working in a channel, if the weighted result of the positional priority and the data type priority of the self-organizing subnet is higher (for example, higher than a predetermined threshold), then the power of this channel may be adjusted higher. However, the present invention is not limited to this; that is to say, any condition needing to be considered may be involved. For example, it is also possible to predetermine that only when there is non-real-time data transmission in a VIP room, it may be considered that the power of another device in another self-organizing subnet, needing to transmit real-time data or best effort data is adjusted to a higher level.

In an example, the method 100 may further include a second power adjustment step (not shown in the drawings, and sometimes called a "second adjustment step") of adjusting the power of a second device in a second self-organizing subnet different from the first self-organizing subnet, working in the first channel so as to let the power influence caused by the second device on the first device in the first self-organizing subnet be zero or less than a predetermined influence value, i.e., let the power coverage of the second self-organizing subnet not enter the boundary of the first second self-organizing subnet. In this example, by utilizing the second adjustment step, it is possible to guarantee that for example, in a VIP room, a very important person may conduct communications using the maximum power of the first channel, and may not be influenced (or may be less influenced) by the co-channel interference due to the second self-organizing subnet sharing the first channel. In this way, it is possible to ensure that the communications conducted in the VIP room is very reliable and very fast (i.e., the communications quality is very high). Moreover, in this way, it is also possible to, under the premise that the communications quality of the first self-organizing subnet is guaranteed, increase the power of the second self-organizing subnet as high as possible.

In an example, the second power adjustment step may further include a step of adjusting the power of the second device in the second self-organizing subnet different from the first second self-organizing subnet, working in the first channel so as to let the power influence caused by the second device on a third device in a third self-organizing subnet different from the first self-organizing subnet, working in the first channel not exceed a predetermined interference power tolerance (noise power spectrum) of the third device in the third self-organizing subnet. In this example, moreover, it is also possible to let the power influence between the two self-organizing subnets different from the first self-organizing subnets, sharing the first channel not exceed the interference power tolerance of each of the two. Here it should be noted that the interference power tolerance means if the power influence does not exceed this power interference tolerance, then the communications quality of the corresponding self-organizing subnet is not too bad, otherwise, the communications quality of the corresponding self-organizing subnet is too bad. For more information about the interference power tolerance, it is possible to refer to, for example, en.wikipedia.org/wiki/Noise_temperature or "Interference Temperature: A Metric for Dynamic Spectrum Utilization" written by Paul J, Kolodzy ([International Journal] 2006 (02) doi:10.1002/nem.608), the entire contents of which hereby are incorporated by reference. In other words, the power coverage of the second self-organizing subnet may enter the boundary of the third self-organizing subnet, but the power influence caused by the second self-organizing subnet on the third self-organizing subnet does not exceed the interference power tolerance of the third device in the third self-organizing subnet. In this way, it is possible to, under the premise that the communications quality of the third self-organizing subnet is guaranteed, increase the power of the second self-organizing subnet as high as possible.

In an example, regarding the interference power tolerance of the third device in the third self-organizing subnet, it is also possible to not consider the power influence caused by the first device in the first self-organizing subnet on the third device in the third self-organizing subnet. The purpose is to guarantee that the power of the first device in the first self-organizing subnet may be adjusted higher, and another self-organizing subnet working in the first channel may not decrease its interference power tolerance due to the adjusted power coverage of the first device in the first self-organizing subnet.

In this way, if the second adjustment step is carried out with regard to all the self-organizing subnets working in the first channel, then it is possible not only to let the power of the first self-organizing subnet be higher but also to let the power of each self-organizing subnets in each of the other self-organizing subnets be able to be adjusted not to influence (or less influence) the first self-organizing subnet, so as to guarantee that the communications quality of the first self-organizing subnet is good, and the power influence on the other self-organizing subnets may not exceed the interference power tolerance of each of the other self-organizing subnets so as to ensure that the communications quality of each of the other self-organizing subnets is not too bad.

In an example, the method 100 may also include a channel assignment step (not shown in the drawings) in which on the basis of the positional information of the plural self-organizing subnets, channel assignment is carried out with respect to the plural self-organizing subnets so that the distance between any two of the plural self-organizing subnets working in the first channel is greater than a predetermined distance. The channel assignment step may be conducted when the plural self-organizing subnets are initialized (i.e., generated), or may also be conducted at any time point before STEP S101. The channel assignment step may adopt a known multi-channel assignment technique. For example, it is possible to adopt a method in which by monitoring and detecting the co-channel interference indication (CCII) value of each channel at a current time, it is possible to choose a channel having the minimum co-channel interference indication value to serve as a working channel. The co-channel interference indication value may indicate the total interference of all self-organizing subnets sharing a same channel. For more information about how to monitor or detect the co-channel interference indication value, it is possible to refer to, for example, Chinese Patent Application No. 201310319684.7, the entire contents of which are hereby incorporated by reference. Moreover, in this example, it is assumed that the distance between any two self-organizing subnets working in a same channel is greater than the predetermined distance while the known multi-channel assignment technique is adopted. In this way, it is possible to let the power of each self-organizing subnet working in the same channel be as large as possible. Here it should be noted that considering the power influence mentioned in the second adjustment step, the larger the distance between two self-organizing subnets is, the higher their powers after adjustment may be, and at the same time, there is no influence or less influence on the communications quality of each of other self-organizing subnets.

In an example, STEP S102 (i.e., the first adjustment step) and/or the second adjustment step and/or the channel assignment step may be conducted by the master node in each self-organizing subnet. In this way, it is possible to distributedly carry out the power adjustment, the channel assignment, etc. between any two self-organizing subnets. That is to say, it is not necessary to utilize an additional designated management device, for example, an access point device to carry out these kinds of processes.

As a result, it is possible to adjust the power of the first device in the first self-organizing subnet working in the first channel, having a higher positional priority to the higher power or the maximum power of the first channel, so that the communications quality of the first device in the first self-organizing subnet may be good. At the same time, it is also possible to, on the basis of the real-time requirement (the data type and the data type priority) of data to be transmitted by another device in another self-organizing subnet, flexibly carry out the power adjustment. Furthermore, the power of the master node and/or the slave node(s) in each of other self-organizing subnets may be adjusted so that the power of each device in each of the other self-organizing subnets working in the first channel may be as large as possible, there is no influence (or less influence) on the first device in the first self-organizing subnet, and the communications quality of each device in each of the other self-organizing subnets may not be too bad. In addition, it is also possible to, by employing the master node in each self-organizing subnet, distributedly carry out the power adjustment, the channel assignment, etc.; that is to say, it is not necessary to utilize an additional designated device to carry out these kinds of processes.

FIG. 2A illustrates an example of STEP 101 shown in FIG. 1.

In FIG. 2A, plural desktop self-organizing subnets on the basis of the NFC technique in an open space are given. As described above, this kind of open space may be two-dimensional or three-dimensional. Here it is assumed that the open space is two-dimensional, for example, desktops 1 to 8 on one floor of a building, as shown in FIG. 2A. According to a predetermined coordinate system based rule, each of the plural desktop self-organizing subnets is given a positional priority. Namely, a positional priority 1 is given to the desktop self-organizing subnet based on the desktop 1; a positional priority 2 is given to the desktop self-organizing subnet based on the desktop 2; . . . ; and a positional priority 8 is given to the desktop self-organizing subnet based on the desktop 8. Here it should be noted that for the sake of convenience, hereinafter, the desktop self-organizing subnets corresponding to the positional priorities 1 to 8 are called desktop self-organizing subnets 1 to 8. In addition, the levels of the positional priorities 1 to 8 step down; that is to say, the level of the positional priority 1 is highest, the level of the positional priority 2 is second highest, the level of the positional priority 3 is third highest, and so on. In this way, it is possible to, according to the levels of the positional priorities 1 to 8, divide the desktop self-organizing subnets 1 to 8 into a VIP subnet, an ordinary subnet, a temporary subnet, etc.

Here it should be noted that the positional priorities 1 to 8 given to the desktop self-organizing subnets 1 to 8 may be set by (1) a master node in each of the desktop self-organizing subnets (i.e., in a distributed way), or (2) an additional management device (i.e., in a central control way). Furthermore, the levels of the positional priorities 1 to 8 may be dynamically adjusted; for example, if necessary, the level of the positional priority 8 may be adjusted to highest from lowest. Of course, the present invention is not limited to this.

Here it is assumed that the master node in each of the desktop self-organizing subnets 1 to 8 may monitor and calculate in real time the co-channel interference indication value of each channel, and may generate a real-time monitoring table in which the co-channel interference indication values correspond to the channels. It is possible to adopt any proper conventional technique to monitor and calculate the co-channel interference indication value of each channel. For more information about that, it is possible to refer to, for example, Chinese Patent Application No. 201310319684.7, the entire contents of which are hereby incorporated by reference. In this way, by monitoring and calculating the co-channel interference indication value of each channel in real time, it is possible to select, by the master node in each of the desktop self-organizing subnets, a working channel when the desktop self-organizing subnets are initialized (generated).

FIG. 2B illustrates an initialization method 200 of a self-organizing subnet.

In general, the method 200 of the self-organizing subnet shown in FIG. 2B is carried out by a master node in the self-organizing subnet, and includes the following steps.

STEP S201: scan and monitor all available channels, and generate a co-channel interference indication value table for each channel in real time.

STEP S202: select, from the co-channel interference indication value tables generated in real time, a channel whose current co-channel interference indication value is minimum to serve as a working channel for the self-organizing subnet.

STEP S203: build the self-organizing subnet by the master node, monitor and manage (authorize) the entry of a new node (device) from outside the self-organizing subnet, and poll each slave node in the self-organizing subnet so as to monitor the departure of this slave node.

STEP S204: establish a communications connection with a master node in another self-organizing subnet so as to exchange cooperational information (here it should be noted that this step is optional).

FIG. 2C illustrates an example of initializing plural self-organizing subnets.

In the example shown in FIG. 2C, the initialization process of each of the plural self-organizing subnets existing in an open space is given. As shown in FIG. 2C, first, a node 102-1 enters a restricted area 20-1, and starts to monitor all channels so as to obtain the co-channel interference indication (CCII) value of each channel. At the same time, the node 102-1 becomes a master node, and determines, on the basis of the obtained co-channel interference indication value of each channel, a channel whose co-channel interference indication value is minimum as a working channel. In this way, a self-organizing subnet 1 (i.e., a desktop NFC self-organizing subnet) based on the restricted area 20-1 is built. After that, a node 103-1 enters the restricted area 20-1, and if the node 103-1 finds that there is the master node 102-1 in the restricted area 20-1, then the node 103-1 sends a request to the master node 102-1 for entering the self-organizing subnet built by the master node 102-1, and become a slave node of the built self-organizing subnet. Here it should be noted the master node 102-1 may maintain the connection of each slave node. For more information about the entry of a node, the authorization on a node, the departure of a node, etc., it is possible to refer to, for example, Chinese Patent Application No. 20131005656.0, the entire contents of which are hereby incorporated by reference.

In addition, regarding a restricted area 20-2 and its corresponding self-organizing subnet 2 (i.e., a desktop NFC self-organizing subnet) built by a master node 102-2 shown in FIG. 2C, they are the same as the restricted area 20-1 and its corresponding self-organizing subnet 1 shown in FIG. 2C. As a result, the description related to the restricted area 20-2 and its corresponding self-organizing subnet 2 are omitted here.

Figure 2D:
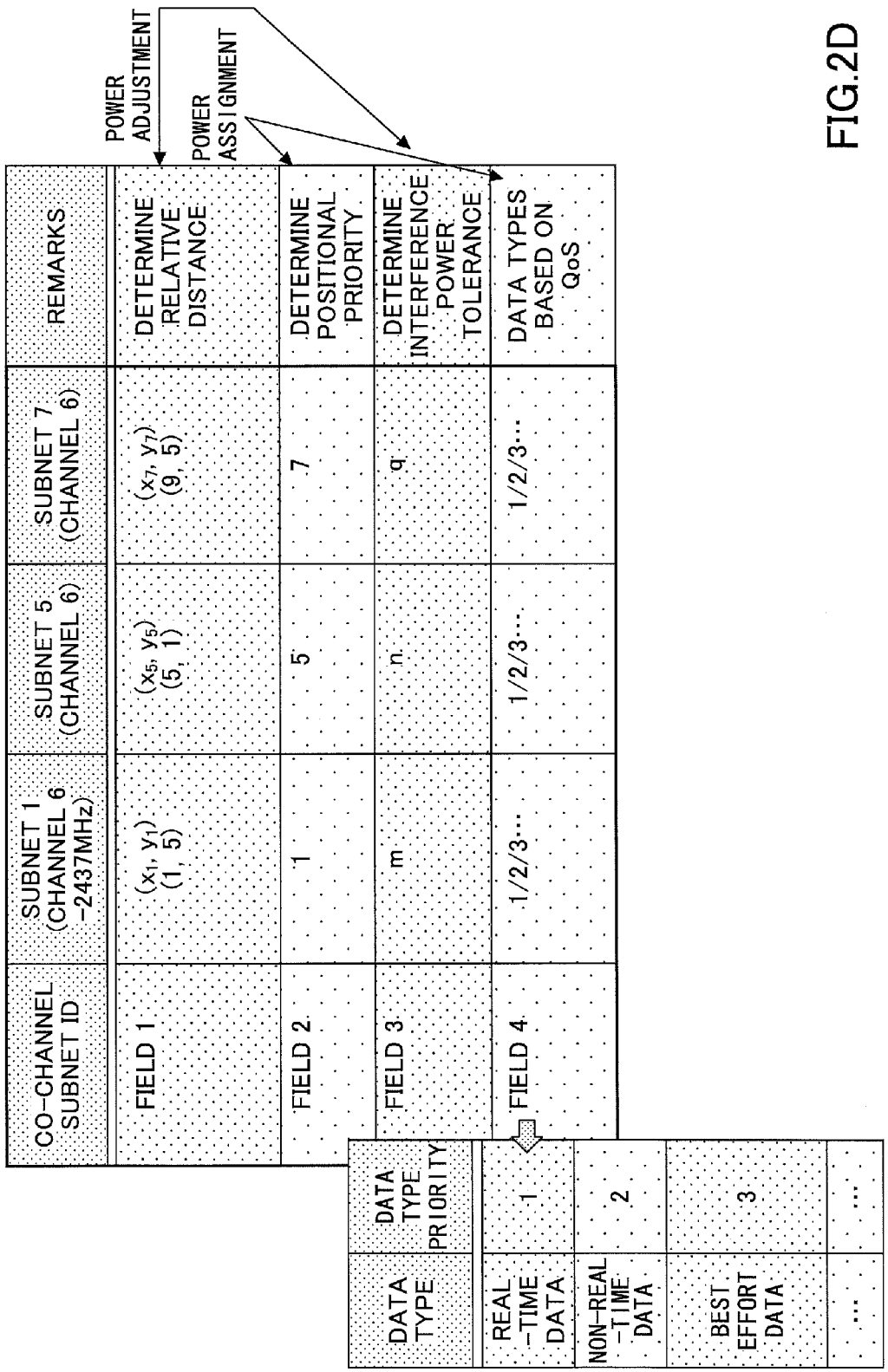
FIG. 2D illustrates a power adjustment reference table including positional priorities, optional data type priorities, and optional interference power allowances of plural self-organizing subnets.

FIG. 2D illustrates a power adjustment reference table (also called a "PAR table") including positional priorities, optional data type priorities, and optional interference power allowances of plural self-organizing subnets.

As shown in FIG. 2D, the power adjustment reference table includes four fields, namely, a positional coordinate field (Field 1), a positional priority field (Field 2), an interference power tolerance field (Field 3), and a data type and/or data type priority field (Field 4) as follows.

(1) Field 1 (Positional Coordinate Field)

A physical position of a self-organizing subnet is defined by coordinates in this field. In general, the physical position of the self-organizing subnet is represented by its center. Here it is assumed that each restricted area (e.g., each desktop) in which a self-organizing subnet is located has an easily-measured shape, for example, a rectangle or circle. In an example, it is assumed that there is an open space that is a two-dimensional space with 6×10 square meters, and plural desktop coordinates are defined in this open space; for example, the center of a first desktop self-organizing subnet is located at the desktop coordinates (1, 5). Of course, the present invention is not limited to this. After the central positional coordinates of each self-organizing subnet are determined, the center of the corresponding self-organizing subnet as well as the approximate positions of devices in the corresponding self-organizing subnet may also be determined. For example, in each of the above-described NFC desktop self-organizing subnets, the approximate position of each device may be determined by utilizing a sub range on the basis of plural secrete key transmitters located in the corresponding self-organizing subnet. Aside from the approximate position of each device in each self-organizing subnet, it is also possible to determine the distance between any two self-organizing subnets or any two device in each self-organizing subnets. Here it should be noted that in the above-mentioned coordinate system, it is considered in general that any two self-organizing subnets have different coordinates; as a result, it is considered in general that any two self-organizing subnets have different positional priorities.

(2) Field 2 (Positional Priority Field)

The determination of the positional priority of each self-organizing subnet has been described above. Namely, a value is set to indicate the positional priority of each self-organizing subnet on the basis of the positional information of the corresponding self-organizing subnet. Here it should be noted that the less the value is, the greater the level of the positional priority of a self-organizing subnet is. However, the present invention is not limited to this; that is to say, it is also possible to set that the greater the value is, the greater the level of the positional priority of a self-organizing subnet is.

(3) Field 3 (Interference Power Tolerance Field)

As described above, the interference power tolerance refers to a maximum interference power that a device in a self-organizing subnet can bear. In other words, the interference power tolerance means that if an interference power does not exceed the interference power tolerance, then the communications quality of the device in the self-organizing subnet is not too bad, otherwise, the communications quality is too bad. On the basis of the interference power tolerance, it is possible to determine the power of a device in a self-organizing subnet different from that having a highest positional priority level.

(4) Filed 4 (Data Type and/or Data Type Priority Filed)

As described above, the data type refers to a type of data to be transmitted by a current self-organizing subnet. On the basis of the data type, it is possible to set a specific value to serve as the priority of the data type, i.e., the data type priority. Similarly, the less the specific value is, the greater the level of the data type priority is, i.e., the higher the data type priority is. The data type priority together with the above-described positional priority may serve as conditions according to which STEP S102 shown in FIG. 1 is conducted.

The above-described four fields make up the power adjustment reference table, and each self-organizing subnet may maintain (have) this kind of power adjustment reference table. It is possible to exchange the power adjustment reference table between any two self-organizing subnets, so that the master node in each self-organizing subnet may carry out the power adjustment step, etc. on the basis of the power adjustment reference table. Of course, this kind of power adjustment reference table is just an example, and the present invention is not limited to this. For example, in a case considering an actual situation, it is also possible to add/delete a field to/from the power adjustment reference table.

Figure 3:
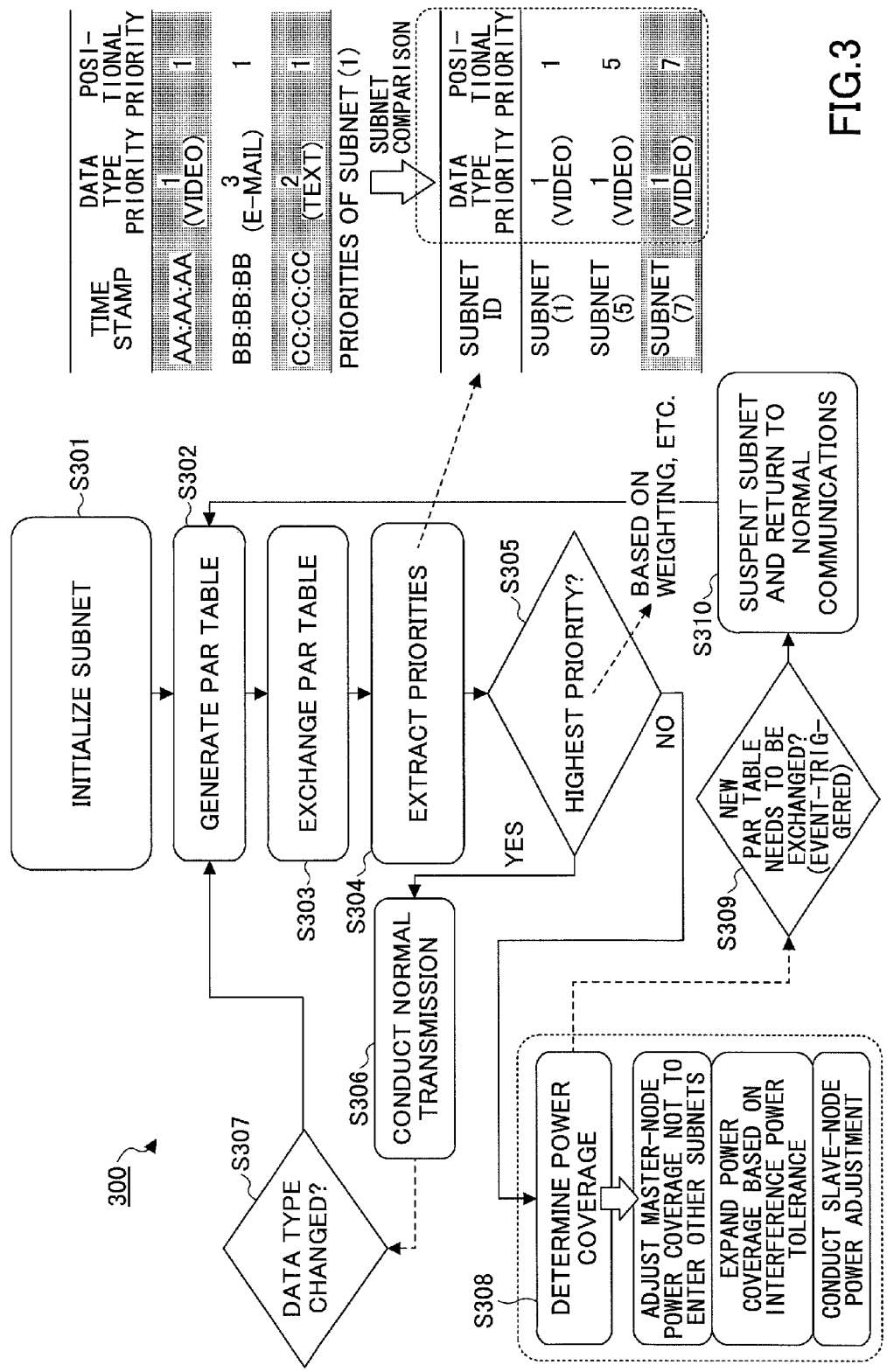
FIG. 3 is a flowchart of a channel power adjustment method on the basis of the positional information of plural area restricted self-organizing subnets, according to an embodiment of the present invention.

FIG. 3 is a flowchart of a channel power adjustment method 300 on the basis of the positional information of area restricted self-organizing subnets, according to an embodiment of the present invention.

In what follows, the method 300 will be given by referring to FIG. 3 on the basis of the power adjustment reference table shown in FIG. 2D. Here it should be noted that the power adjustment reference table may be dynamically changed according to the real-time exchange information of each self-organizing subnet so that it is possible to ensure that the values of the respective fields in the power adjustment reference table are real-time and current. The method 300 includes the following steps.

STEP S301: initialize each self-organizing subnet, including the following sub steps.

(1) Scan and monitor the co-channel interference indication value of each channel (similar to STEP S201 shown in FIG. 2B).

(2) On the basis of the co-channel interference indication values, select a channel to serve as a working channel (similar to STEP S202 shown in FIG. 2B).

(3) Generate each self-organizing subnet by the master node in the corresponding self-organizing subnet (similar to STEPS S203 and S204 shown in FIG. 2B).

(4) Set an initial data type for each self-organizing subnet. Also, it is possible to set a data type having a highest priority level as the default initial data type. Since data transmission has not been started at this time, the initial data type is tentatively set. Of course, this sub step is not must; that is to say, it is also possible not to set this kind of initial data type.

STEP S302: make up a power adjustment reference table (a PAR table) for each self-organizing table, including the positional coordinates, the positional priority, the data type priority, and the interference power tolerance of the corresponding self-organizing subnet, as shown in FIG. 2D.

STEP S303: exchange (by broadcasting and responding) the power adjustment reference table between any two self-organizing subnets so as to obtain the current and real-time information.

STEP S304: extract the positional priorities and the data type priorities from each power adjustment reference table. Of course, this step is optional. Actually, it is also possible to extract only the positional priorities. In this embodiment, both the positional priorities and the data type priorities are extracted so as to perform a more reasonable power adjustment.

STEP S305: select, on the basis of the positional priorities and the data type priorities, a self-organizing subnet currently having a highest priority level. Here it should be noted that there are a lot of approaches of selecting, on the basis of the two conditions (i.e., the positional priorities and the data type priorities), the self-organizing subnet currently having the highest priority level. For example, it is possible to, for each self-organizing subnet, use the weighted result of the two conditions, so as to carry out the selection, as described above. Also it is possible to, for each self-organizing subnet, form a two-dimensional coordinate system by utilizing the two conditions, and to use an approach on the basis of a two-dimensional distance from the origin of the coordinate system, so as to carry out the selection. In addition, actually, a case, where the priority levels of the two conditions are the same, needs to be considered. In this case, for example, it is possible to, for each self-organizing subnet, carry out the selection according to the time stamp information generated in the corresponding power adjustment reference table.

Here it should be noted that the selection of the self-organizing subnet currently having the highest priority level refers to selecting a self-organizing subnet having the highest priority level from plural self-organizing subnets sharing a same channel (i.e., the working channel), and adjusting the power of each device in the selected self-organizing subnet to the maximum power of the working channel. That is to say, it is not necessary to consider the power adjustment of devices in self-organizing subnets working in different channels. The reason is that in general, there is little interference between devices in self-organizing subnets working in different channels. In other words, in this specification, only the positional priority, the data type priority, the interference power tolerance, the power adjustment, etc. of each self-organizing subnet sharing the same channel are taken into account.

In addition, for the sake of convenience, only the power of each device in one self-organizing subnet having the highest priority level is adjusted to the maximum power of the working channel. That is to say, a case where there are plural self-organizing subnets having a highest priority is not taken into account. The reason is that in general, there is only one VIP self-organizing subnet among the respective self-organizing subnets sharing the working channel. Of course, the present invention is not limited to this. It is also possible to adjust the power of each device in plural self-organizing subnets (e.g., two VIP self-organizing subnets) having the highest priority level, sharing the working channel to the higher power of the working channel.

In the selection of STEP S305, if the selected self-organizing subnet currently has the highest priority level, then STEP S306 will be conducted; otherwise, S308 will be conducted.

STEP S306: adjust the power of each device in the selected self-organizing subnet to the maximum power of the working channel, and carry out normal data transmission. Here it should be noted that the maximum power of the working channel may be predetermined on the basis of, for example, the number of self-organizing subnets sharing the working channel and the bandwidth of the working channel.

STEP S307: monitor (determine), by an independent thread, the change of the data type transmitted in the selected self-organizing subset (for example, first a video file is transmitted, then a text file is transmitted, and after that, nothing is transmitted (i.e., an idle state)). If it is determined that the data type has changed, then it is possible to change the data type priority of the selected self-organizing subnet immediately, and at the same time, it is also possible to adjust the power of each device in another self-organizing subnet, in which real-time data needs to be transmitted, to the maximum power of the working channel. Here it should be noted that the idle state may represented by an integer (in this specification, the greater the integer is, the lower the corresponding priority is), for example, 255 (8 bits). Of course, this step is not must.

STEP S308: conduct further power adjustment of each self-organizing subnet by, for example, the master node in the corresponding self-organizing subnet, so that the self-organizing subnet having the highest priority level (i.e., the VIP self-organizing subnet) may not be influenced by the other self-organizing subnets. In addition, optionally, it is possible to let the power influence between any two non-VIP self-organizing subnets not exceed the interference power tolerances of the two. This may be achieved by carrying out the following sub steps.

(1) First, on the basis of the relative positional information of the self-organizing subnets, adjust the power of each master node in each non-VIP self-organizing subnet so as to let the power coverage of each master node in each non-VIP self-organizing subnet not enter the boundary of each of the other self-organizing subnets (including the VIP self-organizing subnet). In this way, it is possible to ensure that the VIP self-organizing subnet may not be influenced by the power of each of the other non-VIP self-organizing subnets. Here, since the boundary of each self-organizing subnet (for example, an area restricted network defined by the NFC technique) is clearly defined, it is easy to achieve the power adjustment of the master node in the corresponding self-organizing subnet so as to let the power coverage of the master node not enter the boundary of each of the other self-organizing subnets.

(2) Second, on the basis of the interference power tolerance of each non-VIP self-organizing subnet, expand the power coverage of the master node in each non-VIP self-organizing subnet to a new power coverage of each self-organizing subnet, generated on the basis of the interference power tolerance of each non-VIP self-organizing subnet.

(3) Similar to the above sub steps (1) and (2), carry out the power adjustment with respect to each slave node in each self-organizing subnet.

STEP S309: similar to STEP S307, monitor (determine), by another independent thread, the change of each of the positional information, the positional priority, the data type priority, and the interference power tolerance of each self-organizing subnet. Once it is determined that the positional information, the positional priority, the data type priority, or the interference power tolerance of a self-organizing subnet has changed, STEP S10 will be conducted. Here it should be noted that the positional information, the positional priority, the data type priority, and the interference power tolerance are also exchanged between any two self-organizing subnets sharing a same channel.

STEP S310: optionally, when the related data transmission ends, or when it is not necessary to assign a VIP room, suspend the state of the current self-organizing subnet, and let each node return to its normal transmission state. After that, STEP S302 will be conducted so as to carry out STEPS S302 to S310 again.

As a result, it is possible to adjust the power of each device in the first self-organizing subnet having a higher positional priority, working in the first channel to the higher power or maximum power of the first channel, so that the communications quality of each device in the first self-organizing subnet is good. At the same time, it is also possible to, on the basis of the real-time requirements (the data type and the data type priority) of the data to be transmitted in each device in the other self-organizing subnets, flexibly carry out the power assignment. Furthermore, the power of the master node and/or the slave node(s) in each of the other self-organizing subnets may be adjusted, so that the power of each device in each self-organizing subnet working in a same channel (for example, the first channel) may be as large as possible; each device in the first self-organizing subnet may not be influenced or may be less influenced so that the communications quality of each device in the first self-organizing subnet is good; and the influence on each device in each of the other self-organizing subnets may not exceed the interference power tolerance of each device in each of the other self-organizing subnets. Moreover, it is also possible to utilize the master node in each self-organizing subnet to distributedly carry out the power adjustment, the channel assignment, etc.; that is to say, it is not necessary to use an additional designated device to carry out these kinds of processes.

Figure 4:
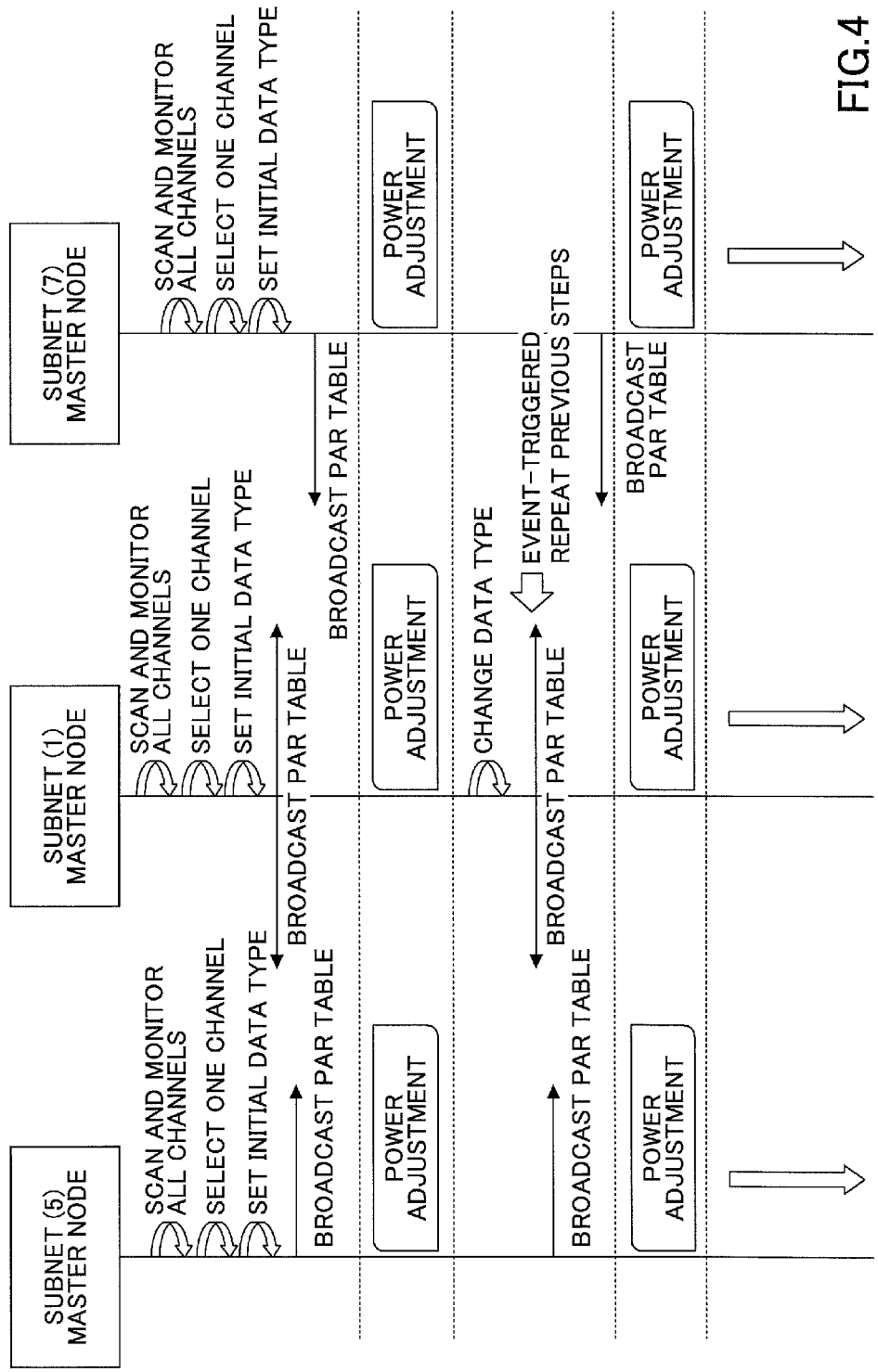
FIG. 4 illustrates a working time sequence of a channel power adjustment method of each of plural master nodes in plural self-organizing subnets.

FIG. 4 illustrates a working time sequence of a channel power adjustment method of each of plural master nodes in plural self-organizing subnets.

As shown in FIG. 4, an example of a working time sequence along a time axis, of a channel power adjustment method of each of plural nodes working in a same channel is given. In particular, regarding each of plural self-organizing subnets (i.e., self-organizing subnet (1), (5), and (7)), first, STEPS S401 to S403 corresponding to STEP S301 shown in FIG. 3 are conducted; second, the positional information, the positional priority, the data type and/or data type priority, the interference power tolerance, and so on of the corresponding self-organizing subnet are broadcasted to the other self-organizing subnets; and third, STEP S306 and/or STEP S308 shown in FIG. 3 are performed. Here it should be noted that since there is the independent thread in STEP S307 shown in FIG. 3, if the data type to be transmitted by each of the plural self-organizing subnets changes, then it is possible to carry out STEPS S302 to S310 shown in FIG. 3 again. Of course, the present invention is not limited to the example shown in FIG. 4.

Figure 5A:
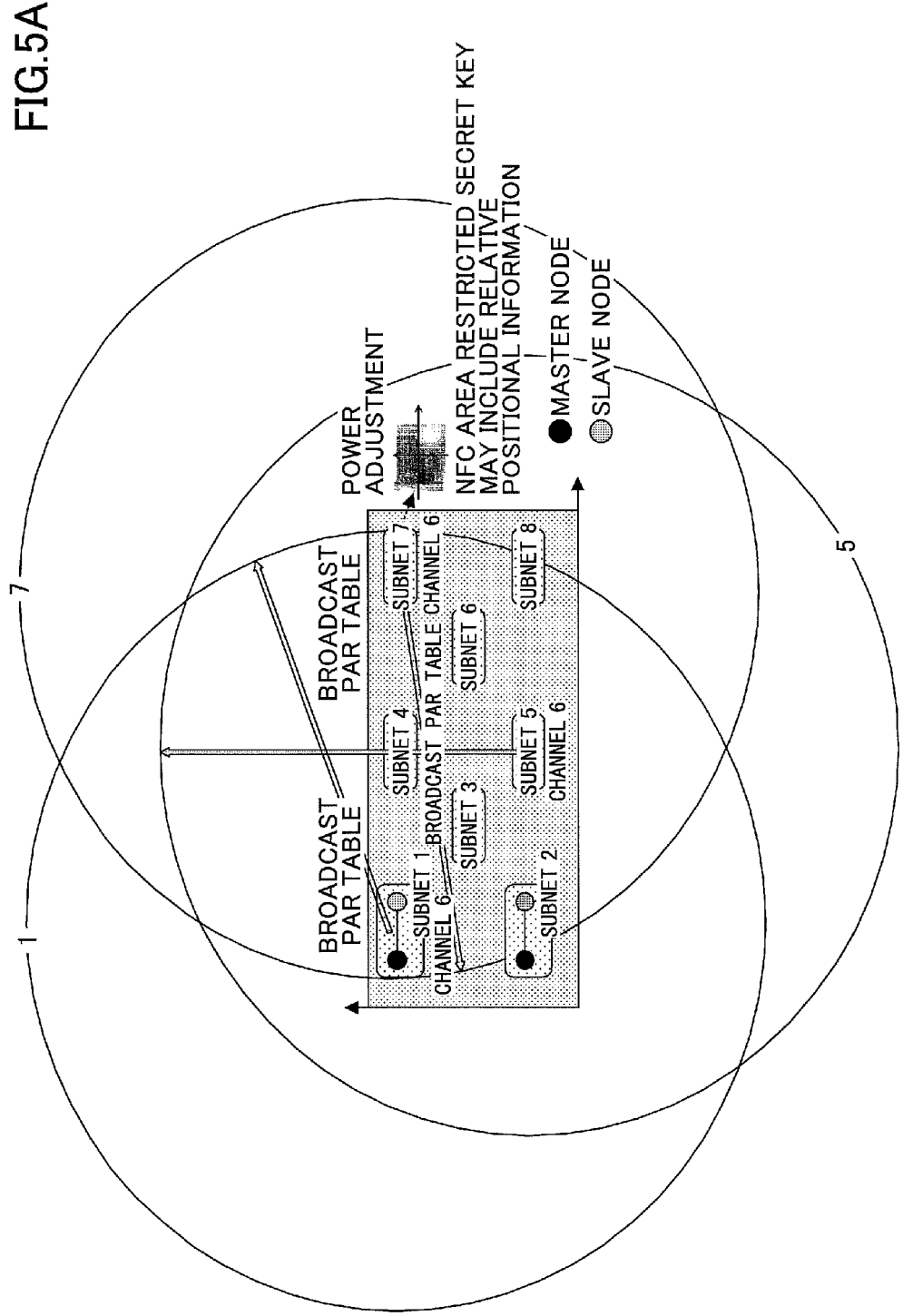
FIGS. 5A and 5B illustrate a process of a second power adjustment step according to an embodiment of the present invention.
Figure 5B:
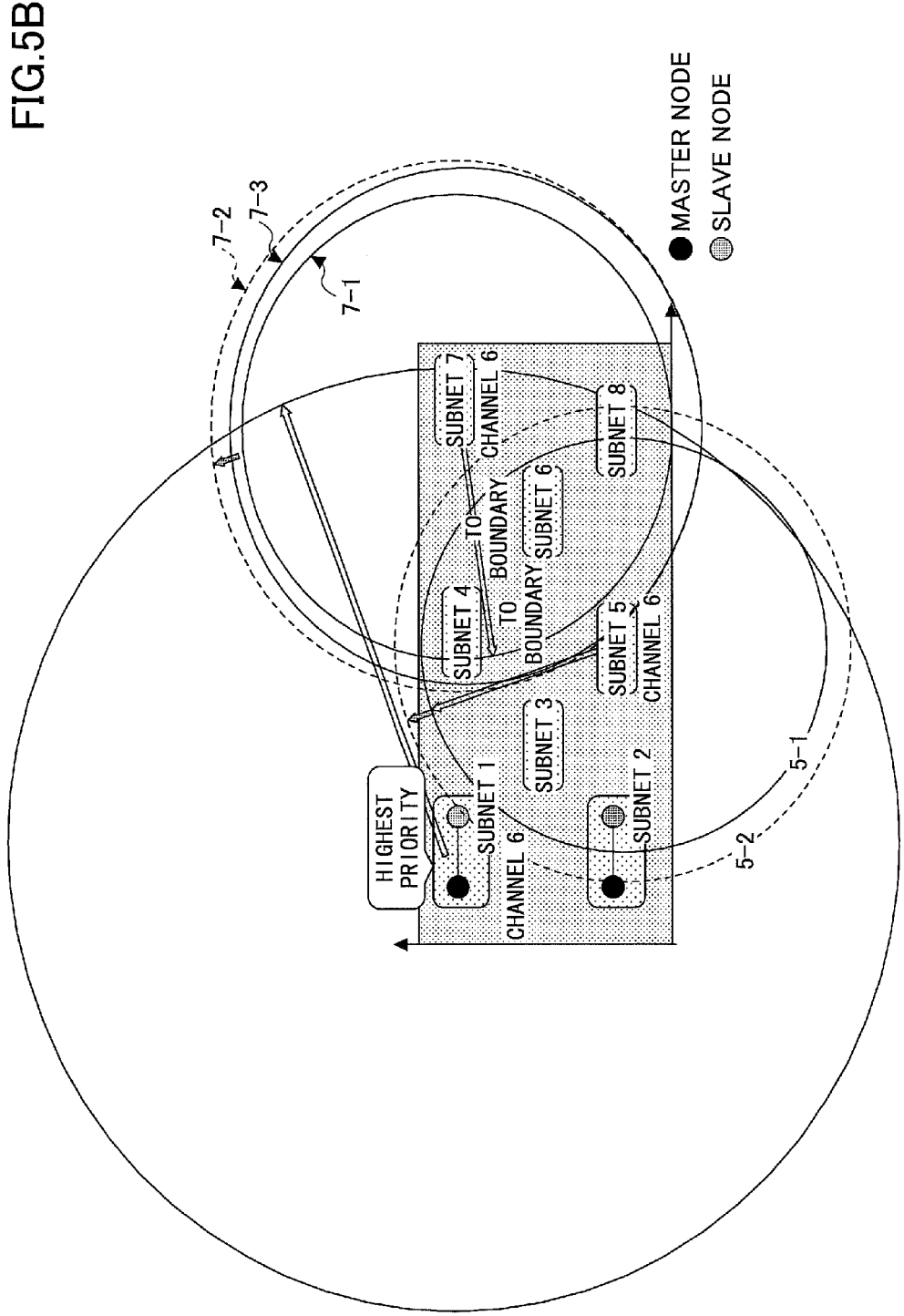

FIGS. 5A and 5B illustrate a process of a second power adjustment step (for example, STEP S308 shown in FIG. 3) according to an embodiment of the present invention.

In particular, as shown in FIGS. 5A and 5B, if it is assumed that a self-organizing subnet 1 having a highest priority level (or the weighted result of the positional priority and the data type priority of the self-organizing subnet 1 (for example, the result obtained by multiplying the positional priority by 0.6 and multiplying the data type priority by 0.4) is highest) works in a channel 6, then after the power of each device in the self-organizing subnet 1 is adjusted to the maximum power of the channel 6, it is possible to adjust the power of each device in other self-organizing subnets working in the same channel 6, for example, the power of each device in the self-organizing subnets 5 and 7.

As shown in FIG. 5A, the power of each device in the self-organizing subnet 1 is maximum, and the power coverage of the corresponding device covers the range of a circle 1. Before the power of each device in the self-organizing subnet 5 and 7 is adjusted, the power coverage of the corresponding device in the self-organizing subnet 5 covers the range of a circle 5, and the power coverage of the corresponding device in the self-organizing subnet 7 covers the range of a circle 7. Here, it is apparent that the power of each device in the self-organizing subnets 5 and 7 may influence (or destroy) the communications quality of each device in the self-organizing subnet 1 having the highest priority level. As a result, it is necessary to adjust the power of each device in the self-organizing subnets 5 and 7, so that the communications quality of each device in the self-organizing subnet 1 may not be influenced by the power coverage of each device in the self-organizing subnets 5 and 7, and at the same time, the communications quality of each device in the self-organizing subnets 5 and 7 may not be too bad.

For this purpose, as shown in FIG. 5B, the power of each master node in the self-organizing subnets 5 and 7 working in the same channel 6 is adjusted, so that the power influence of each master node in the self-organizing subnets 5 and 7 on each device in the self-organizing subnets 1 is zero or less than a predetermined power influence value, i.e., the power coverage of each master node in the self-organizing subnets 5 and 7 may not exceed the boundary of the self-organizing subnet 1. Furthermore, it is also possible to adjust the power of each master node in the self-organizing subnets 5 and 7, so as to let the two master nodes not be influenced by each other, i.e., so as to let the power influence of one of the two master node not exceed the interference power tolerance of the self-organizing subnet in which the other master node is located. As shown in FIG. 5B, by referring to the first sub step of STEP S308 in FIG. 3, on the basis of the relative positional information of the two self-organizing subnets 5 and 7, under the premise that the power of the master node in the self-organizing subnet 1 is constant, first it is possible to decrease the power coverage of the master node in the self-organizing subnet 5 so as to let the decreased power coverage of this master node (see the solid line circle 5-1 of the self-organizing subnet 5) not exceed the boundary of each of the self-organizing subnets 1 and 7 as well as to decrease the power coverage of the master node in the self-organizing subnet 7 so as to let the decreased power coverage of this master node (see the solid line circle 7-1 of the self-organizing subnet 7) not exceed the boundary of each of the self-organizing subnets 1 and 5.

After that, by referring to the second sub step of STEP S308 in FIG. 3, for example, it is possible to expand the power coverage of the master node in the self-organizing subnet 7 so as to let the expanded power coverage (the dotted line circle 7-2 around the self-organizing subnet 7) reach a position defined on the basis of the interference power tolerance of the self-organizing subnet 5. However, regarding the self-organizing subnet 5, it is impossible to expand the power coverage of its master node so as to let the expanded power coverage reach the dotted line circle 5-2 around the self-organizing subnet 5. The reason is that if the expanded power coverage of the master node in the self-organizing subnet 5 reaches the dotted line circle 5-2 around the self-organizing subnet 5, then the expanded power coverage of the master node in the self-organizing subnet 5 may enter the boundary of the self-organizing subnet 1 so that the communications quality of the master node in the self-organizing subnet 1 may influenced. Of course, this is just an example. Actually, it is also possible to, on the basis of a need, expand the power coverage of the master node in the self-organizing subnet 5 so as to let the expanded power coverage of the master node in the self-organizing subnet 5 reach a position defined on the basis of the interference power tolerance of the self-organizing subnet 1 (for example, the dotted line circle 5-2 around the self-organizing subnet 5). That is to say, the present invention is not limited to the example shown in FIG. 5B.

After that, optionally, after the power (or the power coverage) of each master node in each self-organizing subnet is adjusted, it is possible to adjust the power (or the power coverage) of each slave node in each self-organizing subnet in a similar way. For example, a solid line circle 7-3 around the self-organizing subnet 7 in FIG. 5B indicates an expanded power coverage of a slave node in the self-organizing subnet 7.

As a result, it is possible to adjust the power of each master node and/or slave node in each of the other self-organizing subnets, so that the power of each device in each self-organizing subnet working in the same channel may be adjusted as high as possible; the communications quality of each device in the first self-organizing subnet may not be influence or may be less influenced; and the communications quality of each device in each of the other self-organizing subnets is not too bad.

Figure 6:
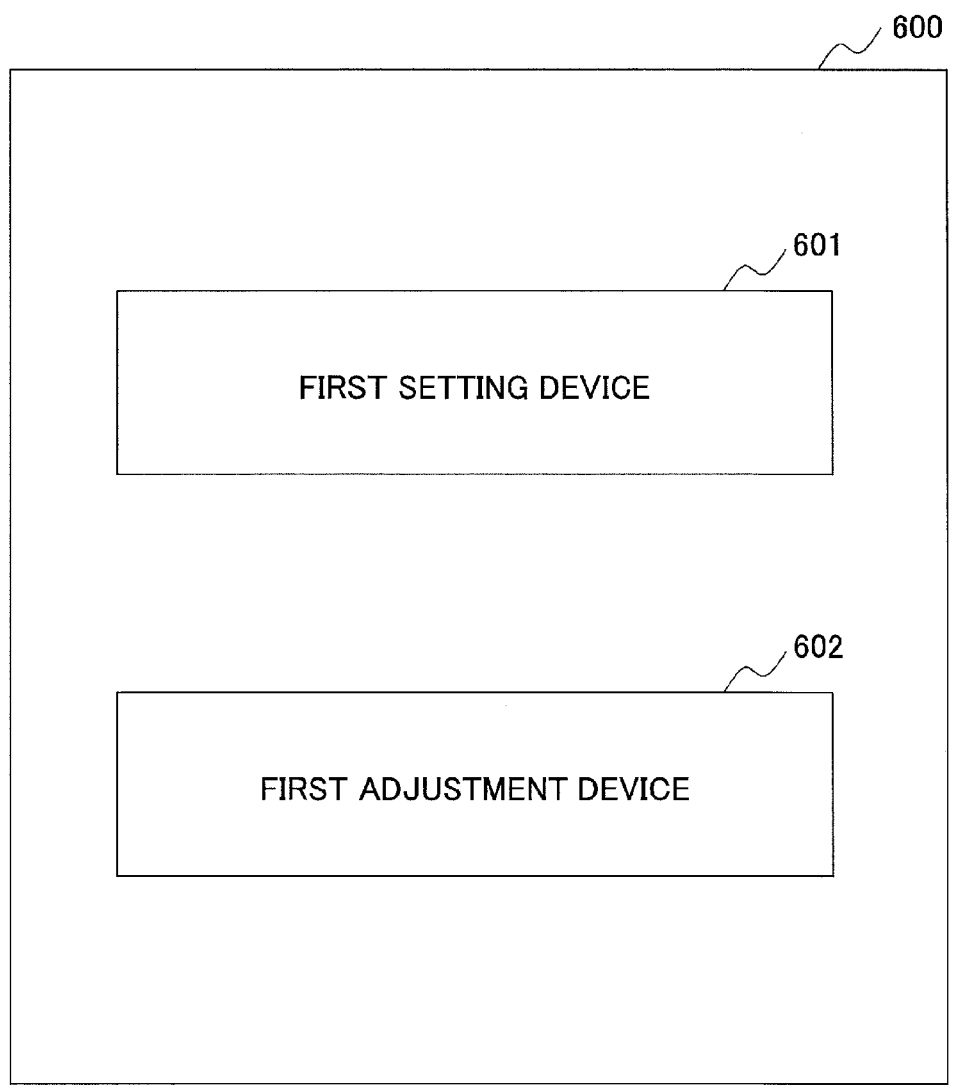
FIG. 6 is a block diagram of a channel power adjustment system on the basis of the positional information of plural area restricted self-organizing subnets, according to an embodiment of the present invention.

FIG. 6 is a block diagram of a channel power adjustment system 600 on the basis of the positional information of area restricted self-organizing subnets, according to an embodiment of the present invention.

As shown in FIG. 6, the system 600 includes a first setting device 601 and a first adjustment device (also called a "first power adjustment device") 602. The first setting device 601 is configured to carry out a first setting step, i.e., setting, on the basis of the positional information of plural self-organizing subnets, the positional priority for each of the plural self-organizing subnets. The first adjustment device 602 is configured to carry out a first power adjustment step (also called a "first adjustment step"), i.e., adjusting, at least partially based on the positional priorities of the plural self-organizing subnets, the power of a first device in a first self-organizing subnet working in a first channel, satisfying a predetermined rule to a first power of the first channel.

Here it should be noted that the positional information of the plural self-organizing subnets is a kind of two-dimensional information, for example, two-dimensional positions of the respective self-organizing subnets in a same floor of a building, or is a kind of three-dimensional information, for example, three-dimensional positions of the respective self-organizing subnets in different floors of a building. Furthermore, the first setting device 601 may be included in, for example, a master node in each of the plural self-organizing subnets, or may be a dedicated controller; however, the present invention is not limited to this. Moreover, the first power of the first channel may be a higher power higher than a predetermined power, or may be the maximum power of the first channel.

As a result, in this embodiment, it is possible to set, on the basis of the positional information of the plural self-organizing subnets, the positional priority of each of the plural self-organizing subnets. In an example, a self-organizing subnet in a main conference room (e.g., a VIP (Very Important Person) room) of a company may be set having a highest positional priority; a self-organizing subnet in a refreshing room of the company may be set having a lowest positional priority; and so on. Consequently, when adjusting, at least partially based on the positional priorities of the plural self-organizing subnets, the power of the first device in the first self-organizing subnet working in the first channel to the first power of the first channel, in a case of this example, it is possible to adjust the power of each device in the self-organizing subnet in the main conference room to the maximum power of the channel in which this device works. Furthermore, the positional priorities of the respective self-organizing subnets may be periodically or nonperiodically adjusted. In this way, it is possible to dynamically set the positional priority of a self-organizing subnet to be highest. For example, if there is an important guest in the refreshing room, then it is possible to change the positional priority of the self-organizing subnet in the refreshing room from lowest to highest so as to ensure that the important guest may carry out fast communications.

Here it should be noted that the maximum power or the higher power of the first channel which is higher than the predetermined power may be predetermined on the basis of the bandwidth of the first channel as well as the number of self-organizing subnets sharing the first channel.

In this way, it is possible to adjust the power of each device in a self-organizing subnet working in the first channel to the higher power or the maximum power of the first channel, so that this device in the self-organizing subnet may communicate with another device in the same self-organizing subnet using the higher power or the maximum power of the first channel.

In an example, the first self-organizing subnet working in the first channel, satisfying the predetermined rule may be a self-organizing subnet whose positional priority is higher than a predetermined positional priority, or a self-organizing subnet whose positional priority is highest. In other words, the power of each device in a self-organizing subnet, whose positional priority is higher or highest and which is working in the first channel, may be adjusted to the higher power or the maximum power of the first channel.

In an example, the system 600 may further include a second setting device (not shown in the drawings) configured to carry out a second setting step, i.e., setting, on the basis of the types of data to be transmitted by the plural self-organizing subnets, a data type priority for each of the types of data. Accordingly, the first adjustment device 602 may further be configured to carry out a step of, on the basis of the positional priorities and the data type priorities of the plural self-organizing subnets, adjusting the power of the first device in the first self-organizing subnet working in the first channel, satisfying the predetermined rule to the first power of the first channel. In this example, the data to be transmitted may be divided into plural data types on the basis of the real-time requirements or the QoS requirements of the data. For example, a data type determined based on a kind of division method may include, for instance, real time data (e.g., video data or other data whose real-time requirement is higher), non-real-time data (e.g., text data or other data whose real-time requirement is lower), and best effort data (e.g., an electronic mail or other data as real-time as possible). By adding the data type priorities to serve as one of the conditions to be considered when adjusting the power of the first channel, it is possible to, for example, in a case where there isn't data transmission or there is only non-real-time transmission in the above-mentioned VIP room, temporarily adjust (reduce) the power (i.e., the higher power or the maximum power) of the first channel, so as to let the power of another device in another self-organizing subnet located in a non-VIP room be the power of the first channel so that the other device may conduct real-time data transmission by using the power of the first channel.

In an example, the first self-organizing subnet working in the first channel, satisfying the predetermined rule includes one of the following, namely, at least one self-organizing subnet that the weighted result of its positional priority and data type priority is higher than a predetermined level; and at least one self-organizing subnets that the weighted result of its positional priority and data type priority is highest. Here it should be noted that since both the two conditions, i.e., the positional priorities and data type priorities need to be considered when performing the channel power adjustment, it is possible to obtain the weighted result of the two so as to conduct the channel power adjustment on the basis of the weighted result. For example, regarding a self-organizing subnet working in a channel, if the weighted result of the positional priority and the data type priority of the self-organizing subnet is higher (for example, higher than a predetermined threshold), then the power of this channel may be adjusted higher. However, the present invention is not limited to this; that is to say, any condition needing to be considered may be adopted. For example, it is also possible to predetermine that only when there is non-real-time data transmission in, for example, a VIP room, it may be considered that the power of another device in another self-organizing subnet, needing to transmit real-time data or best effort data is adjusted to a higher level.

In an example, the system 600 may further include a second power adjustment device (not shown in the drawings, and sometimes called a "second adjustment device") configured to carry out a second power adjustment step (also called a "second adjustment step"), i.e., adjusting the power of a second device in a second self-organizing subnet different from the first self-organizing subnet, working in the first channel so as to let the power influence caused by the second device on the first device in the first self-organizing subnet be zero or less than a predetermined influence value, i.e., let the power coverage of the second self-organizing subnet not enter the boundary of the first second self-organizing subnet. In this example, by utilizing the second adjustment device, it is possible to guarantee that for example, in a VIP room, a very important person may conduct communications using the maximum power of the first channel, and may not be influenced (or may be less influenced) by the co-channel interference due to the second self-organizing subnet sharing the first channel. In this way, it is possible to ensure that the communications conducted in the VIP room is very reliable and very fast (i.e., the communications quality is very high). Moreover, in this way, it is also possible to, under the premise that the communications quality of the first self-organizing subnet is guaranteed, increase the power of the second self-organizing subnet as high as possible.

In an example, the second adjustment device may further be configured to carry out a step of adjusting the power of the second device in the second self-organizing subnet different from the first second self-organizing subnet, working in the same first channel so as to let the power influence caused by the second device on a third device in a third self-organizing subnet different from the first self-organizing subnet, working in the first channel not exceed a predetermined interference power tolerance (noise power spectrum) of the third device in the third self-organizing subnet. In this example, moreover, it is also possible to let the power influence between the two self-organizing subnets different from the first self-organizing subnets, sharing the first channel not exceed the interference power tolerance of each of the two. Here it should be noted that the interference power tolerance means if the power influence does not exceed this power interference tolerance, then the communications quality of the corresponding self-organizing subnet is not too bad, otherwise, the communications quality of the corresponding self-organizing subnet is too bad. For more information about the interference power tolerance, it is possible to refer to, for example, en.wikipedia.org/wiki/Noise_temperature or "Interference Temperature: A Metric for Dynamic Spectrum Utilization" written by Paul J Kolodzy ([International Journal] 2006 (02) doi:10.1002/nem.608), the entire contents of which hereby are incorporated by reference. In other words, the power coverage of the second self-organizing subnet may enter the boundary of the third self-organizing subnet, but the power influence caused by the second self-organizing subnet on the third self-organizing subnet does not exceed the interference power tolerance of the third device in third self-organizing subnet. In this way, it is possible to, under the premise that the communications quality of the third self-organizing subnet is guaranteed, increase the power of the second self-organizing subnet as high as possible.

In an example, regarding the interference power tolerance of the third device in the third self-organizing subnet, it is also possible to not consider the power influence caused by the first device in the first self-organizing subnet on the third device in the third self-organizing subnet. The purpose is to guarantee that the power of the first device in the first self-organizing subnet may be adjusted higher, and another self-organizing subnet working in the first channel may not decrease its interference power tolerance due to the adjusted power coverage of the first device in the first self-organizing subnet.

In this way, if the second adjustment device carried out the above steps with regard to all the self-organizing subnets working in the first channel, then it is possible not only to let the power of the first self-organizing subnet be higher but also to let the power of each self-organizing subnets in each of the other self-organizing subnets be able to be adjusted not to influence (or less influence) the first self-organizing subnet, so as to guarantee that the communications quality of the first self-organizing subnet is good, and the power influence on the other self-organizing subnets may not exceed the interference power tolerance of each of the other self-organizing subnets so as to ensure that the communications quality of each of the other self-organizing subnets is not too bad.

In an example, the system 600 may also include a channel assignment device (not shown in the drawings) configured to carry out a channel assignment step, in which on the basis of the positional information of the plural self-organizing subnets, channel assignment is carried out with respect to the plural self-organizing subnets so that the distance between any two of the plural self-organizing subnets working in the first channel is greater than a predetermined distance. The channel assignment step may be conducted when the plural self-organizing subnets are initialized (i.e., generated), or may also be conducted at any time point before the first adjustment device 602 works. The channel assignment step may adopt a known multi-channel assignment technique. For example, it is possible to adopt a method in which by monitoring and detecting the co-channel interference indication value of each channel at a current time, it is possible to choose a channel having the minimum co-channel interference indication value to serve as a working channel. The co-channel interference indication value may indicate the total interference of all self-organizing subnets sharing a same channel. For more information about how to monitor or detect the co-channel interference indication value, it is possible to refer to, for example, Chinese Patent Application No. 201310319684.7, the entire contents of which are hereby incorporated by reference. Moreover, in this example, it is assumed that the distance between any two self-organizing subnets working in a same channel is greater than the predetermined distance while the known multichannel assignment technique is adopted. In this way, it is possible to let the power of each self-organizing subnet working in a same channel be as large as possible. Here it should be noted that considering the power influence mentioned in the second adjustment step, the larger the distance between two self-organizing subnets, the greater their powers after adjustment may be, and at the same time, there is no influence or less influence on the communications quality of any other self-organizing subnet.

In an example, the first adjustment device 602 and/or the second adjustment device and/or the channel assignment device may be included in the master node in each self-organizing subnet. In this way, it is possible to distributedly carry out the power adjustment, the channel assignment, etc. between any two self-organizing subnets. That is to say, it is not necessary to utilize an additional designated management device, for example, an access point device to carry out these kinds of processes.

As a result, it is possible to adjust the power of the first device in the first self-organizing subnet working in the first channel, having a higher positional priority to the higher power or the maximum power of the first channel, so that the communications quality of the first device in the first self-organizing subnet may be good. At the same time, it is also possible to, on the basis of the real-time requirement (the data type and the data type priority) of data to be transmitted by another device in another self-organizing subnet, flexibly carry out the power adjustment. Furthermore, the power of the master node and/or the slave node(s) in each of other self-organizing subnets may be adjusted so that the power of each device in each of the other self-organizing subnets working in the first channel may be as large as possible; there is no influence (or less influence) on the first device in the first self-organizing subnet; and the communications quality of each device in each of the other self-organizing subnets may not be too bad. In addition, it is also possible to, by employing the master node in each self-organizing subnet, distributedly carry out the power adjustment, the channel assignment, etc.; that is to say, it is not necessary to utilize an additional designated device to carry out these kinds of processes.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201310574407.0 filed on Nov. 15, 2013, the entire contents of which are hereby incorporated by reference.

What is claimed is:

1. A channel power adjustment method based on positional information of plural self-organizing subnets in a restricted area, comprising:
setting, based on the positional information of the plural self-organizing subnets, a positional priority for each of the plural self-organizing subnets; and
adjusting a power of a first device in a first self-organizing subnet working in a first channel and satisfying a predetermined rule to a first power of the first channel, the predetermined rule being at least partially based on the positional priorities of the plural self-organizing subnets.

2. The method according to claim 1, wherein:
the first self-organizing subnet working in the first channel and satisfying the predetermined rule includes one of
a self-organizing subnet whose positional priority is higher than a predetermined positional priority; and
a self-organizing subnet whose positional priority is highest,
wherein,
the first power of the first channel is a maximum power of the first channel or a power larger than a predetermined power.

3. The method according to claim 1, further comprising:
setting, based on types of data to be transmitted by the plural self-organizing subnets, a data type priority for each of the plural self-organizing subnets,
wherein the predetermined rule is based on the positional priorities and the data type priorities of the plural self-organizing subnets.

4. The method according to claim 3, wherein:
the first self-organizing subnet working in the first channel and satisfying the predetermined rule includes one of
a self-organizing subnet whose priority based on a weighted result of the positional priority and the data type priority is higher than a predetermined priority; and
at least one self-organizing subnet whose priority based on a weighted result of the positional priority and the data type priority is highest,
wherein,
the first power of the first channel is a maximum power of the first channel or a power larger than a predetermined power.

5. The method according to claim 1, further comprising:
adjusting a power of a second device in a second self-organizing subnet which is different from the first self-organizing subnet and works in the same first channel, so that a power influence caused by the second device in the second self-organizing subnet on the first device in the first self-organizing subnet is zero or less than a predetermined influence value.

6. The method according to claim 5, further comprising:
adjusting the power of the second device in the second self-organizing subnet so that a power influence caused by the second device in the second self-organizing subnet on a third self-organizing subnet, which is different from the first and second self-organizing subnets and works in the same first channel, does not exceed an interference power tolerance of a third device in the third self-organizing subnet.

7. The method according to claim 6, wherein:
the interference power tolerance of the third device in the third self-organizing subnet is determined without taking into account a power influence caused by the first device in the first self-organizing subnet on the third device in the third self-organizing subnet.

8. The method according to claim 1, further comprising:
before the adjusting of the power of the first device, selecting the first channel from plural channels for the plural self-organizing subnets based on the positional information of the plural self-organizing subnets so that a distance between any two self-organizing subnets working in the same first channel is greater than a predetermine distance.

9. The method according to claim 1, wherein:
the adjusting of the power of the first device is carried out by a master node in each of the plural self-organizing subnets.

10. A channel power adjustment system based on positional information of plural self-organizing subnets in a restricted area, the system comprising:
a memory that stores a program; and
a processor that executes the program to perform a process including
setting, based on the positional information of the plural self-organizing subnets, a positional priority for each of the plural self-organizing subnets; and
adjusting a power of a first device in a first self-organizing subnet working in a first channel and satisfying a predetermined rule to a first power of the first channel, the predetermined rule being at least partially based on the positional priorities of the plural self-organizing subnets.

* * * * *